United States Patent
James

(10) Patent No.: US 6,447,675 B1
(45) Date of Patent: Sep. 10, 2002

(54) FISH POND FILTER SYSTEM

(76) Inventor: Ron James, 209 Mohr St., Lake Elsinore, CA (US) 92530

( * ) Notice: Subject to any disclaimer, the term of this patent is extended or adjusted under 35 U.S.C. 154(b) by 0 days.

(21) Appl. No.: 09/652,228

(22) Filed: Aug. 29, 2000

(51) Int. Cl.$^7$ ................................................ C02F 3/06
(52) U.S. Cl. ...................... 210/150; 210/169; 210/170; 210/279; 210/618; 261/DIG. 72
(58) Field of Search .................................. 210/150, 151, 210/169, 277, 279, 288, 618, 170; 261/DIG. 72

(56) References Cited

U.S. PATENT DOCUMENTS

| | | | | |
|---|---|---|---|---|
| 2,461,619 A | * | 2/1949 | Wolcott | 210/279 |
| 3,493,116 A | * | 2/1970 | Edmiston | 210/277 |
| 3,547,270 A | * | 12/1970 | Kass | 210/279 |
| 3,957,931 A | * | 5/1976 | Ellis et al. | 210/150 |
| 4,122,011 A | * | 10/1978 | Strigle, Jr. | 210/150 |
| 4,297,209 A | | 10/1981 | DeVisser et al. | |
| 4,683,062 A | | 7/1987 | Krovak et al. | |
| 4,800,021 A | * | 1/1989 | Desbos | 210/150 |
| 5,160,039 A | | 11/1992 | Colburn | |
| 5,217,616 A | * | 6/1993 | Sanyal et al. | 210/150 |
| 5,490,924 A | | 2/1996 | Macia et al. | |
| 5,543,039 A | * | 8/1996 | Odegaard | 210/150 |
| 5,985,148 A | | 11/1999 | Liu | |

OTHER PUBLICATIONS

"System 2000; The Ultimate Pond Filter", Aqua UltraViolet Sales Brochure.

"Suspended Carrier Processes"; Purac/Technology/Suspended Carriers, http:/www.purac.se/se/suspend.htm, Apr. 4, 2000.

Rusten, Bjorn and Neu, Kenneth E., "Down to Size: Moving–bed Biofilm Reactors more into the small–flow treatment arena", Water Environment & Technology, Jan. 1999, pp. 27–33.

* cited by examiner

*Primary Examiner*—Christopher Upton
(74) *Attorney, Agent, or Firm*—Knobbe, Martens, Olson & Bear, LLP

(57) ABSTRACT

A system for filtering and treating waste generated or collected in the water of a fish pond. The system includes a pump, pre-filter, piping, a valve assembly, and a filter media container enclosing a plurality of discrete filter media. The filter media are generally hollow, plastic structures with a plurality of external ribs and internal dividing walls. The filter media has a high surface area-to-volume ratio and can support a high volumetric density of naturally occurring heterotrophic bacteria. The heterotrophic bacteria establish colonies on the internal and external surfaces of the filter media and biologically metabolize waste that is trapped on the media. The bacterial metabolization transforms much of the waste to an aesthetically and biologically neutral form thereby reducing the need for chemical treatment of the pond water. The system includes a backwashing mode to agitate and remove unreacted waste from the system and direct the waste stream out of the system, preferably to be used as fertilizer.

26 Claims, 7 Drawing Sheets

FISH POND FILTER SYSTEM

BACKGROUND OF THE INVENTION

1. Field of the Invention

The present invention relates to the field of ornamental landscaping and, in particular, to a filter system designed to efficiently remove solid wastes and biologically decompose suspended wastes in fish ponds.

2. Description of the Related Art

Fish ponds accumulate and generate a variety of contaminants and waste products that must be removed and treated to maintain the attractive appearance of the fish pond and the health of the fish living therein. The exposed water surface tends to retain air blown dust, dirt, and leaves and other plant matter that falls in. The fish themselves produce excrement that is a solid waste material and a source of unwanted biological activity. The temperate closed water ecosystem that is essential for the fish is also an excellent environment for the growth of algae and other undesirable living organisms. Fish food that remains uneaten by the fish can contaminate the pond and nourish undesirable living organisms. The closed system of a fish pond also favors chemical processes such as ammonia production that, if left unchecked, can rapidly degrade the appearance of the fish pond and its ability to support healthy fish.

The accepted method of maintaining the health and appearance of a fish pond is to separate the solid waste from the water, react the chemicals to either remove them or make them non-damaging, and treat the water to kill undesirable organisms. Two methods have typically been used to do this. One is to filter out the solid wastes and dispose of them, treat the water with a variety of chemicals and/or high intensity UV light to kill biological undesirables, and react the undesirable chemicals. The other is to employ a filter medium that retains the solid waste and decomposes the waste with biologically active bacteria that live on the filter medium. This method would also typically require treatment with high intensity UV light or chemicals to eliminate the undesirable biological and chemical constituents, although the chemical and/or UV light treatment regimen may not be as rigorous as with simple filtering.

A variety of methods and apparatuses are known to remove solid material from a liquid, however a major concern with removal of solid waste is what to do with the waste once it is separated from the water. Separation devices that depend on density differences, such as a centrifuge, are not effective in fish pond applications because many of the waste solids are approximately the same density as the water they are in, therefore the effective devices typically employ some type of filtering to trap the solids. The two major ways to handle the separated waste are to discard the waste trapped in a filter along with the filter or to backwash the filter and direct the waste stream elsewhere. A disadvantage of removing the waste trapped in a filter along with the filter is that generally these types of filters are a single use filter and thus must be replaced with a new one when the old one is full. It can be appreciated that the labor and cost to perform this replacement would be a drawback to a user for which the fish pond is a decorative and recreational item.

In order to avoid the cost and inconvenience of changing filter elements, the preferred method of removing trapped waste is to utilize some form of backwashing. Backwashing essentially consists of reversing the direction of water flow in the filter and thereby forcing the waste products out a waste outlet. The filter media does not typically need to be removed and after the backwashing is complete, the filter media is ready to retain more waste. Advantageously, fish ponds are often located adjacent garden areas and the backwashed water contains partially decomposed fish and vegetable waste that makes a beneficial fertilizer in the garden. However, the water discharged in the backwashing procedure is typically a cost to the user and minimizing water discharge is a concern particularly in areas where water is in limited supply.

The biological reaction process is an advantageous adjunct because the heterotrophic bacteria that perform the reaction are naturally occurring in the pond water. No user action is needed to establish and maintain a colony of beneficial bacteria other than to provide a place for them to live. Also, biological reaction converts many of the undesirable chemicals to non-harmful forms and thus reduces the need for chemical treatment. The chemicals used for chemical treatment are relatively expensive and many users would understandably like to minimize their handling of chemicals. The heterotrophic bacteria are not suited to live freely suspended in water and require a surface on which to grow. This has typically been done on the filter medium which generally consists of a gravel bed or filter mat.

A disadvantage to biological reaction is the relatively large amount of reactor volume and time typically required for the process to occur. With traditional gravel or filter mats, a biological filter/reactor can require a filter/reactor volume of up to 40% of the volume of the pond itself. It can be appreciated that such a large filter/reactor assembly is expensive to purchase and install and can negatively affect the aesthetics of the fish pond system. In addition a traditional biological reaction filter design can require several weeks to several months for the bacteria to substantially decompose the deposited wastes. The time required for waste decomposition must be such that the waste is decomposed at at least the rate it is deposited. Otherwise the filter becomes overloaded and can no longer protect the health and appearance of the pond.

As the bacteria live on a solid surface, there is an upper limit to how many can live on a given area, i.e. their population density. The time and volume required for a biological reaction filter can be dramatically reduced by providing increased area for the bacteria to live on and thereby increasing the number of bacteria resident in the filter reactor. The optimal filter media provides the highest surface area-to-volume ratio possible. With gravel or fibrous mats, the bacteria live on the surface and from a consideration of the shape of a piece of gravel or fiber it can be seen that other configurations of filter media would provide greater surface area for a given volume of media.

One type of filter media on the market with a higher surface area to volume ratio than gravel or fibers is the ACE-1400 media. The ACE-1400 media is made of plastic tubing with a specific gravity slightly less than one, which is cut to be slightly longer than the diameter of the tubing. The ACE-1400 is approximately 3.5 mm in diameter and 5 mm long. It can be appreciated that a hollow tube can support bacteria on both the outer and the inner surface. The size and shape of the hollow tube media is such that it has 15 to 20 times the surface area of an equivalent volume of gravel or fiber matting.

The ACE-1400 type media is typically placed in a container and pond water is pumped through the container so as to flow generally upwards. Since the ACE-1400 media has a specific gravity slightly less than one, the media floats towards the top of the container. Since the pond water is generally flowing upwards in the container, waterborne waste material is trapped throughout the media, but predominantly towards the bottom. The naturally occurring bacteria reside on and within the ACE-1400 media and digest the waste that lodges within the media.

The container is also provided with valves and piping to backwash the container periodically by reversing the water flow direction downwards and then out of the container. The backwashing causes the media to swirl and tumble, thereby releasing trapped solids. A properly sized container filled with the appropriate amount of media would generally require backwashing once a week. The container is provided with screens so that the media does not escape the container during either backwashing or normal operation. The filter system is also provided with screens to restrict larger solids such as leaves, twigs, and fish from being pumped into the filter container.

It can be appreciated that the more media that is in a filter system, the more surface area is provided for heterotrophic bacteria growth. However, because the ACE-1400 filter media is of a uniform size and shape, movement of the water tends to cause the filter elements to stack in a uniform manner, particularly when the container is filled to a relatively high percentage of capacity. The stacking process tends to create channels or voids in the filter media. These channels provide paths for the water to flow along without requiring that the water pass through the filter media. It can be appreciated that the filter is not effective in trapping and decomposing wastes if the water is not passing through the media. The stirring motion of backwashing randomizes the orientation of the filter elements, however they tend to re-stack and create channels in a relatively short time after the system returns to normal filtering flow.

While the ACE-1400 filter media and system offer advantages over traditional disposable filters and chemical treatment or gravel or fiber matting filter systems employing biological waste decomposition, it can be appreciated that improvements upon this system would be an advantage to the users of fish ponds. It can be appreciated that there is an ongoing need for a filter system for fish ponds that employs naturally occurring bacterial metabolization of wastes to remove these wastes from fish ponds. The system should be economical to purchase and install. The filter media should be reusable and provide the maximum surface area to volume ratio possible to support a maximum number of beneficial bacteria and to enable the system to be sized as small as possible and decompose the solid wastes as rapidly as possible. The system should require minimal use of chemicals to treat the water. The backwashing method should be as efficient as possible to remove the maximum amount of waste and extend the periods between backwashes, while avoiding channeling effects and corresponding failure to filter.

SUMMARY OF THE INVENTION

The aforementioned needs are satisfied by the fish pond filter system of the present invention, which in one aspect is a novel filter media with an increased surface area-to-volume ratio. In another aspect, the invention is a filter reactor with a more efficient backwashing system.

The extruded bio-tube filter media of the present invention is formed from extruded ABS plastic with a specific gravity slightly greater than one. The extruded bio-tube is generally tubular with internal and external ribbing. The addition of the internal and external ribbing provides approximately twice the surface area for the bio-tube of the present invention compared to a similar sized simple tube media, such as the ACE-1400. In addition, the internal ribbing provides smaller interior passages and allows the media to trap proportionally smaller waste material.

An additional advantageous feature of the present invention is that the media is provided in several different sizes. Also, the present invention is sized so as to be generally 1.3 times as long as it is in diameter. The differing sizes and the shape of the media of the present invention inhibit uniform stacking of the media material. Since the media cannot readily stack together in a uniform fashion, channeling of the material is also inhibited.

In another aspect of the invention, an efficient backwashing system is provided. The system includes jets adapted to create a vortex within the filter media container during the backwashing operation. The vortex created more efficiently dislodges accumulated waste material and directs the dislodged waste and carrier water out a waste pipe. The vortex created within the fish pond filter system of the present invention more completely cleans the filter media in a shorter time and requires less water to do so. Thus, the fish pond filter system saves time and money. These and other objects and advantages of the present invention will become more fully apparent from the following description taken in conjunction with the accompanying drawings.

DETAILED DESCRIPTION OF THE PREFERRED EMBODIMENT

Figure 10:
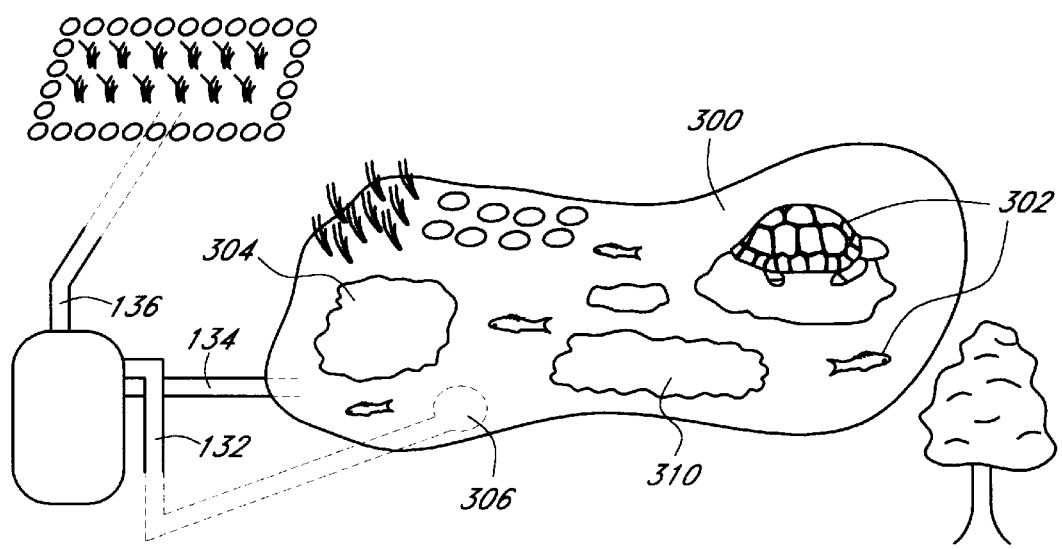
FIG. 10 shows a typical installation of the fish pond filter system.

Reference will now be made to the drawings, wherein like numerals refer to like parts throughout. A fish pond filter system 100 draws water from a fish pond 300, filters and treats the water to remove waste 304, and returns the water to the fish pond 300 as shown in FIG. 10. The fish pond 300 of this embodiment is an open air, closed-system container of water. The fish pond 300 can be outside or placed within a building or other enclosed structure. The fish pond 300 includes a plurality of fish 302. Fish 302 shall herein be understood to include fish, crawdads, mud puppies, frogs, turtles, shrimps, or any other vertebrate or invertebrate animals suited to live at least partially in an aquatic environment. The fish 302 generate waste 304, which is at least in part at least semi-solid biological waste material. Waste 304 shall be herein understood to also include other material that finds its way into the fish pond 300 such as leaves, other vegetable matter, dirt, or insects. The fish pond filter system 100 also includes naturally occurring heterotrophic bacteria 310. The heterotrophic bacteria 310 feed on the waste 304 typically found in a fish pond 300 and remove the waste 304 from the fish pond 300 in a manner that will be described in greater detail below. The fish pond filter system 100 comprises a pre-filter 306 as shown in FIG. 10 which is positioned and adapted to screen out larger waste 304 particles which are approximately larger than 1/8" in a well known manner.

Figure 1:
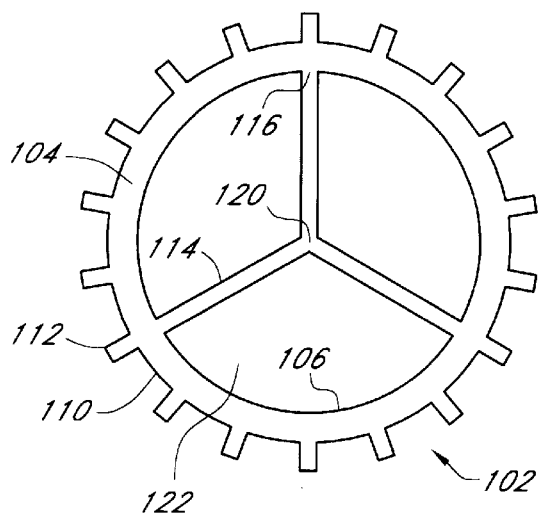
FIG. 1 is an end view of a typical bio-tube of the present invention.
Figure 2:
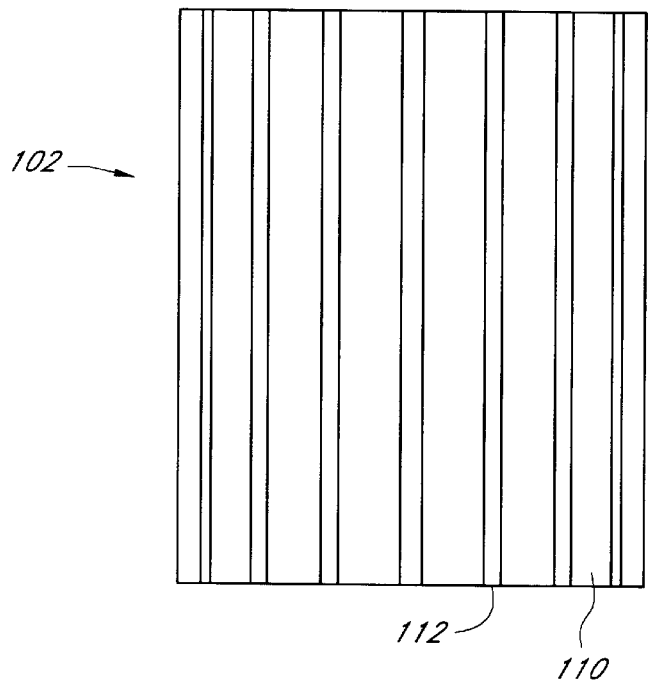
FIG. 2 is a side view of a typical bio-tube of the present invention.

The fish pond filter system 100 comprises bio-tube 102 filter media as shown in FIGS. 1 and 2. The bio-tubes 102 provide a surface to support the growth of heterotrophic bacteria 310 in a manner which is well known in the art and will be better appreciated following a more detailed description of the structure of the bio-tubes 102 and the fish pond filter system 100. The bio-tubes 102 also retain and subsequently release water-borne solid waste 304 materials which the fish pond filter system 100 passes over the bio-tubes 102 in a manner that will be described in greater detail below. The bio-tubes 102, of this embodiment, are extruded from ABS plastic in a well known manner. The bio-tubes 102 are provided with a plurality of integral structures formed at the same time and which will be described in greater detail below. The bio-tubes 102 of this embodiment have a finished specific gravity slightly greater than one so as to be slightly non-buoyant in water.

The bio-tubes 102 structure comprises a ring wall 104. The ring wall 104, of this embodiment, is made of ABS plastic and is generally an elongate, hollow, openended cylinder approximately 0.300" outside diameter, 0.250" inner diameter, and 0.390" in length. The ring wall 104 has a wall thickness of approximately 0.025" and provides a growth surface for bacteria in a manner that will be described in greater detail below. The ring wall 104 has an inner surface 106 and an outer surface 110 coaxial with and opposite the inner surface 106.

The structure of the bio-tubes 102 further comprises external ribs 112. The external ribs 112 are made of the same ABS plastic material as the bio-tubes 102 and are generally elongate rectangles of approximately 0.018"×0.035"× 0.390". The external ribs 112 are extruded with the bio-tubes 102 such that a first side of the external ribs 112 is adjacent and materially continuous with the outer surface 110 of the ring wall 104. The external ribs 112 are positioned such that the long axis of the external ribs 112 (0.390") is coaxial with the long axis of the bio-tube 102. In this embodiment, 18 external ribs 112 extend radially. outward from the outer surface 110 of the ring wall 104 and are approximately equally spaced about the circumference of the ring wall 104 which in this embodiment is approximately every 20° of angle. The external ribs 112 provide additional surface area to support the growth of heterotrophic bacteria 310.

The structure of the bio-tubes 102 also comprises divider walls 114. In this embodiment, the divider walls 114 are three elongate rectangles approximately 0.018"×0.125"× 0.390" and are made from the same ABS plastic as the bio-tubes 104. The divider walls 114 have a first edge 116 along a long edge (0.390") and a second edge 120 opposite the first edge 116. The divider walls 114 are positioned such that the first edges 116 of the divider walls 114 are adjacent and materially continuous with the inner surface 106 of the ring wall 104 and the second edge 120 of each divider wall 114 is adjacent and materially continuous with the second edge 120 of each of the other divider walls 114. The divider walls 114 are further positioned so as to be approximately equally spaced radially outwards from the common second edges 120, which in this embodiment is 120° of angle. The divider 114 walls also support growth of heterotrophic bacteria 310.

It should be appreciated that the ring wall 104, externals ribs 112, and divider walls 114 are all structures of the bio-tube 102 and, in the preferred embodiment, are extruded at the same time and from the same ABS material. The bio-tube 102 with the structures described has a surface area available for bacterial 310 growth that is approximately twice the surface area of a simple hollow, open-ended cylinder of similar dimensions, but without the external ribs 112 and the divider walls 114. It should be appreciated that the overall shape of the bio-tube 102 and the number, shape, and placement of the external ribs 112 and divider walls 114 can be varied by one skilled in the art from the configurations described in this preferred embodiment without detracting from the spirit of the disclosed invention.

The bio-tubes 102 also comprise a plurality of internal passages 122. The internal passages 122 are the openings within the bio-tubes 102 defined by two adjacent divider walls 114 and the included arc of the inner surface 106 of the ring wall 104. The inner passages 122 provide a restricted opening for the passage of water and block and hold solid waste 304 material that is larger than the dimensions of the inner passage 122. In this embodiment, the inner passages 122 will block solid objects that are generally larger than 0.100" in at least two orthogonal dimensions. The bio-tubes 102 with internal passages 122 block solid objects that are approximately one-third as large as simple hollow cylinders of comparable size.

Figure 3:
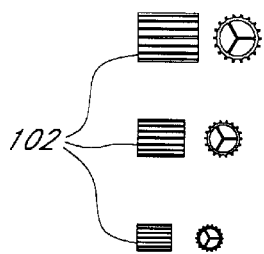
FIG. 3 shows end and side views of three different sizes of bio-tubes of the present invention and their relative sizes.

FIG. 3 shows one embodiment of the present invention with three different sizes of bio-tubes 102. The bio-tubes 102 as shown are generally cylinders and in this embodiment are approximately 0.180" diameter by 0.234" long, 0.240" in diameter by 0.312" long, and 0.300" in diameter by 0.390" long. The different sizes of bio-tubes 102 inhibits uniform stacking of the bio-tubes 102 during use in a manner which will be described in greater detail below. It should be appreciated that alternative shapes, sizes, and number of different sizes and/or shapes of bio-tubes 102 could be employed without detracting from the spirit of the present invention.

Figure 4:
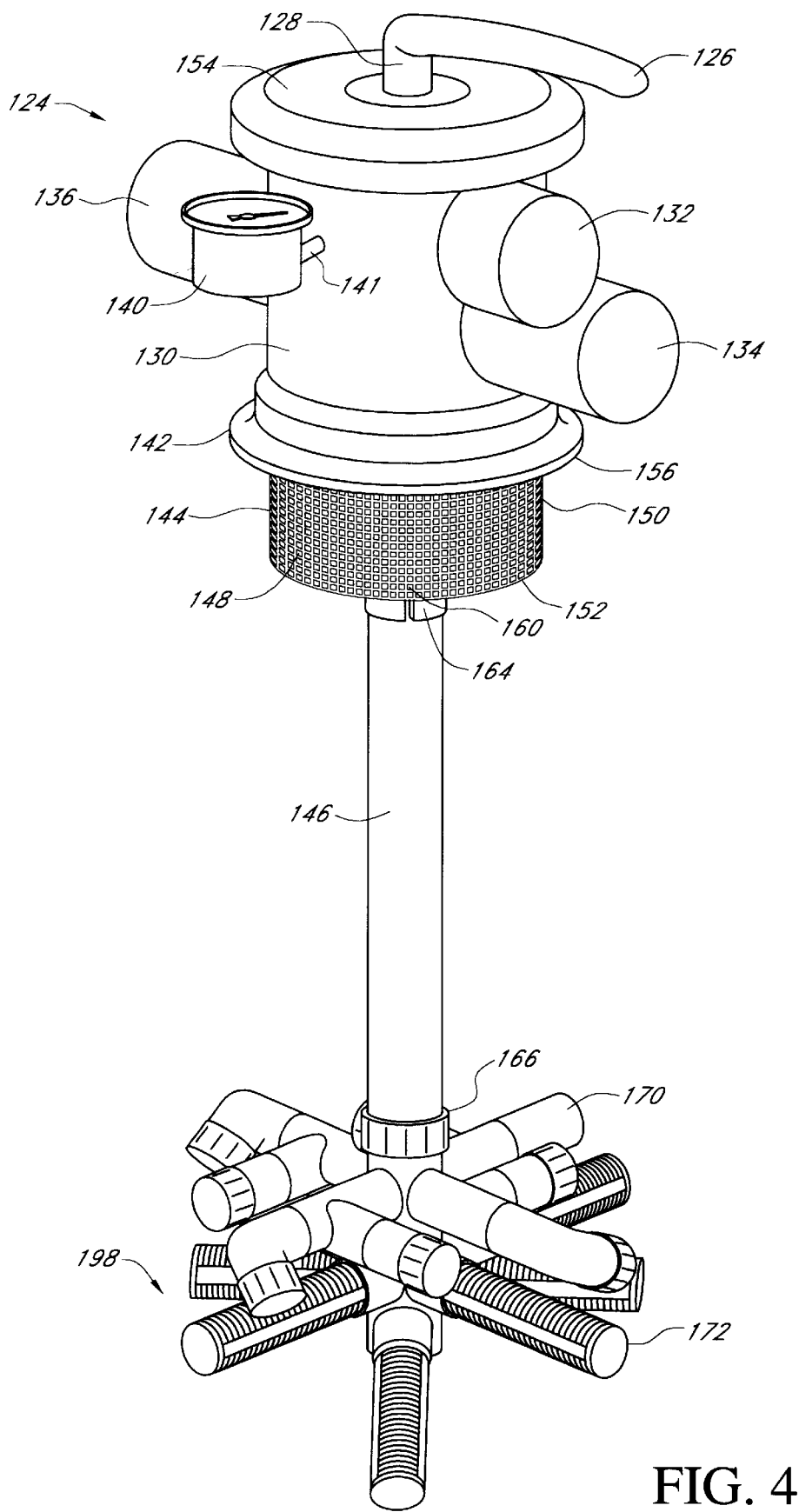
FIG. 4 is an assembled, perspective view of the internal plumbing of a fish pond filter container assembly.

The fish pond filter system 100 also comprises a water flow controller 124 as shown in FIG. 4. The water flow controller 124 comprises a valve body 130. The valve body 130 is provided with internal structures to control water flow in a manner well understood by those skilled in the art. The water flow controller 124 also comprises a valve handle 126, which is an elongate member, approximately 8" in major dimension and made of a plastic material. A first end 128 of the valve handle 126 is rotatably affixed to a top end 154 of the valve body 130 such that rotation of the valve handle 126 induces the valve body 130 to freely permit or restrict water flow through an inlet pipe 132, an outlet pipe 134, a waste pipe 136, and/or a stand pipe 146 all exiting from the valve body 130 in response to the positioning of the valve handle 126.

The inlet pipe 132, outlet pipe 134, waste pipe 136, and stand pipe 146 of this embodiment are elongate members, generally open cylinders in profile, and made of a PVC plastic material. The inlet pipe 132 receives untreated water from the fish pond 300. The outlet pipe 134 directs water which has been treated and filtered by the fish pond filter system 100 in a manner which will be described in greater detail below back to the fish pond 300. The waste pipe 136 directs water, which may contain waste material 304, out of the fish pond filter system 100. The stand pipe 146 directs water flow to and from a backwash jet assembly 170 and intake tube assembly 172 in a manner which will be described in greater detail below.

The water flow controller 124 also comprises a pressure gauge/sight glass 140. A first end 141 of the pressure gauge/sight glass 140 is provided with standard ¼" NPT and is therewith threaded into the valve body 130 in a well known manner. The pressure gauge/sight glass 140 is adapted to provide a visual indication of the water pressure within the valve body 130 in a well known manner. The pressure gauge/sight glass 140 is also adapted to provide a visual indication of the presence of water within the valve body 130. The water pressure indicated by and the visual condition of the water seen in the pressure gauge/sight glass 140 serve as indicia for an operator to control the operation of the fish pond filter system 100 in a manner which will be described in greater detail below.

Figure 9:
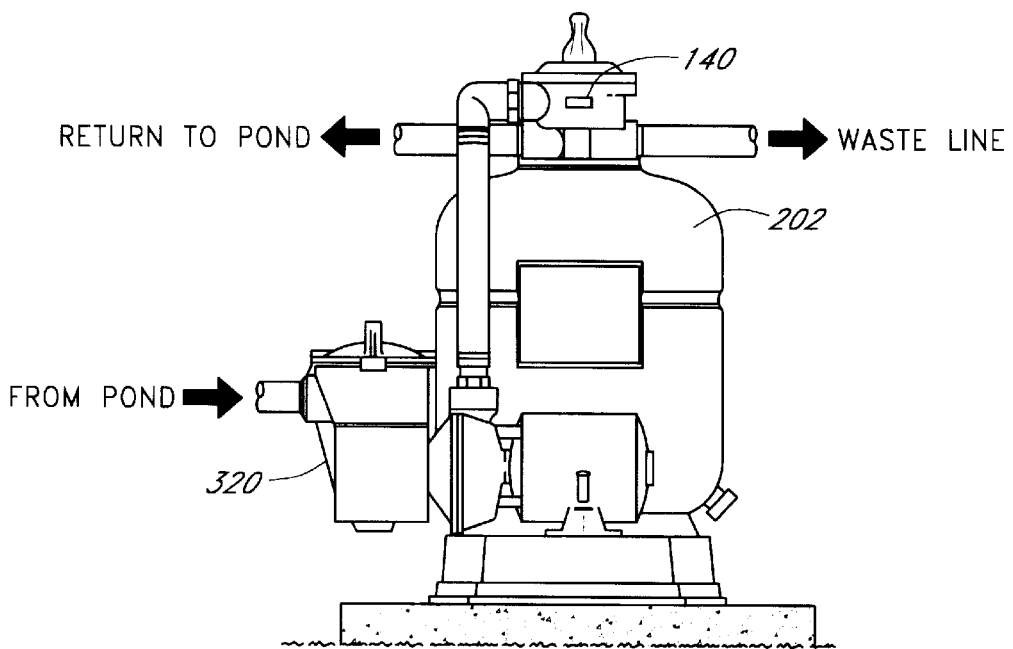
FIG. 9 is a side view of the assembled fish pond filter system.

The water flow controller 124 also comprises an attachment flange 142. The attachment flange 142 is generally circular and approximately 7" in diameter. The attachment flange 142 is made of a plastic material and is adapted to attach the water flow controller 124 to a container 202, as shown in FIG. 9, in a manner that will be described in greater detail below.

The water flow controller 124 also comprises a media screen 144. The media screen 144 is generally a cylinder, open on a first end 150, closed on a second end 152 and approximately 6" in diameter and 4" high. The media screen 144 is made of a plastic material and is provided with a plurality of openings 148. The openings 148 are generally rectangular, through-going holes in the media screen 144 sized so as to block passage of the bio-tubes 102 through the media screen 144 yet to readily allow the passage of liquid water. The media screen 144 has a second end 152 opposite the first end 150. A circular opening 160 is provided in the center of the second end 152 of the filter screen 144. The opening 160 is sized to fit closely around the outer diameter of the stand pipe 146, which, in this embodiment, is approximately 1½" in diameter.

The first end 150 of the media screen 144 is placed adjacent a bottom end 156 of the valve body 130 opposite the top end 154. The media screen 144 is positioned such that the opening 160 is aligned with the center of the bottom end 156 of the valve body 130. The media screen 144 is attached to the bottom end 156 of the valve body 130 with a plurality of screws in a well known manner. A first end 164 of the stand pipe 146 is positioned through the opening 160 in the media screen 144 and further into contact with the valve body 130 so as to securely attach to the valve body 130 and the media screen 144 in a friction fit in a well known manner.

Figure 5:
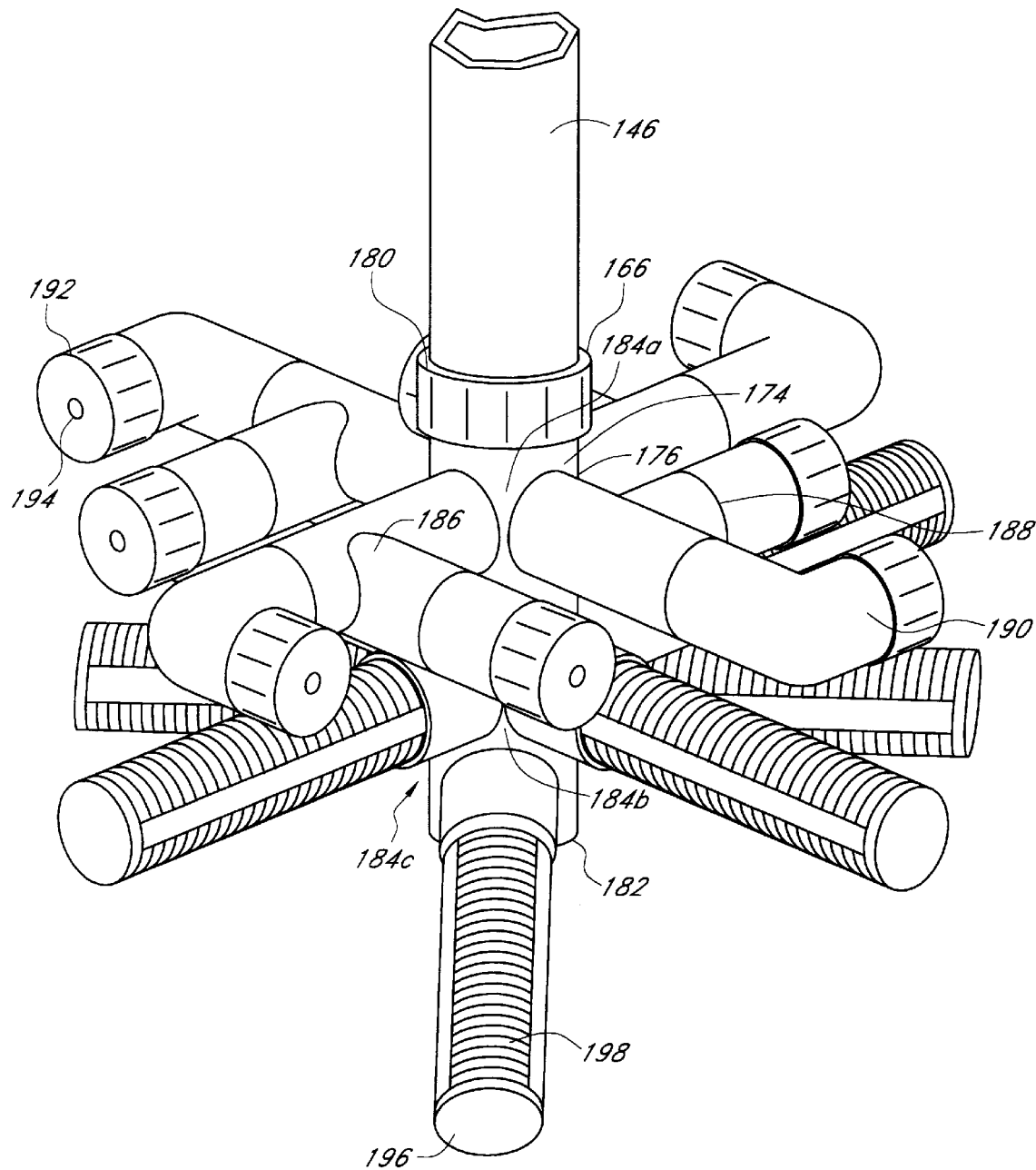
FIG. 5 is a close-up perspective view of the backwash jets and intake pipe assemblies of a fish pond filter system.

A second end 166 of the stand pipe 146 is connected to the backwash jet assembly 170 and the intake tube assembly 172 as shown in FIG. 4 and in a close-up view in FIG. 5. The backwash jet assembly 170 of this embodiment comprises a manifold 174. The manifold 174 is made of a PVC plastic material and is adapted to contain and direct water flow in a manner which will be described in greater detail below. The manifold 174 includes 12 ports 176. The ports 176 are adapted to direct water flow and are part of and made of the same material as the manifold 174. The ports 176 are generally circular structures of the manifold 174 which extend radially outward and are arranged in three levels 184a–c. Each level 184a–c comprises four ports 176 positioned so as to be at the same distance along the major axis of the manifold 174 and to be approximately equally spaced about the circumference of the manifold 174 which is approximately a spacing of 90° of angle apart.

A top end 180 of the manifold 174 is provided with female threads in a well known manner. The second end 166 of the stand pipe 146 is provided with male threads in a well known manner such that the male threads of the stand pipe 146 mate with the female threads of the manifold 174. The top end 180 of the manifold 174 and the second end 166 of the stand pipe 146 are threaded together to achieve the connection between the stand pipe 146 and the backwash jet assembly 170 and the intake pipe assembly 172. In an alternative embodiment, the threading referred to above need not be present and the manifold 174 and the second end 166 of the stand pipe 146 are joined with a cementing process well known to those skilled in the art.

A first level 184a comprising four ports 176 is located approximately 1" from the top end 180 of the manifold. A t-fitting 186 is connected to each port 176 by a cementing process well known in the art. The t-fittings 186 are plastic pipe structures adapted to direct the flow of water in two substantially orthogonal directions. The t-fittings 186 have three openings 188 for the passage of water. A first opening 188 of each t-fitting 186 is attached to a port 176 of the first level 184 of the manifold 174 with a known cementing process. A second opening 188 of each t-fitting 186 opposite the first opening 188 is connected to a first opening 188 of an elbow 190 with a known cementing process.

The elbows 190 are plastic pipe structures which are bent at approximately a 90° angle such that water that enters one opening 188 of the elbow exits a second opening 188 in a direction generally 90° from the direction it entered. Jet caps 192 are connected to the second opening 188 of each elbow 190 and to the third opening 188 of each t-fitting 186 using a known cementing process. The jet caps 192 are generally cylindrical, open on one end, and closed on the other end. The jet caps 192 are made of a PVC plastic material and are sized to conform closely to the openings 188 of the t-fittings 186 and the elbows 190. The jet caps 192 are provided with a jet opening 194 in the closed end. The jet opening 194 is a through-going hole in the jet cap 192. The jet opening 194 is sized to permit restricted flow of water such that water delivered under pressure to the inside of the jet caps 194 exits at a high velocity through the jet opening 194.

The t-fittings 186 and elbows 190 are connected to each other and the manifold 174 such that the jet caps 192 fitted to the t-fittings 186 and the elbows 190 point generally tangentially in a clockwise or counterclockwise direction in the plane of the first level 184. The t-fittings 186 and elbows 190 are further positioned such that the t-fittings 186 and elbows 190 point at an elevation or declination from the plane of the level 184a so as to have an elevation or declination of generally between 0° and ±45° from the plane of the level 184a and thereby the plane of the tangential clockwise or counterclockwise direction. Thus water that is supplied to the t-fittings 186 and elbows 190 is directed out of the jet openings 194 so as to spray out in a generally tangential manner but also in a slightly elevated or declined direction. This serves to create a vortical flow pattern for the backwashing in a manner that will be described in greater detail below.

The intake tube assembly 172 comprises a second 184b and third level 184c located approximately 3" and 5" from the top end 180 of the manifold 174 respectively. Each of the second and third levels 184 comprises four ports 176 as previously described with respect to the backwash jet assembly 170. A first end of an intake tube 196 is attached to each of the ports 176 of the second and third levels 184 of the manifold 174 such that the intake tube assembly 172 comprises eight intake tubes 196. The intake tubes 196 are generally hollow, cylindrical, elongate members, open on the first end, closed on a second end, and made of a plastic material. The intake tubes 196 are provided with a plurality of intake openings 198 positioned between the first and second ends. The intake openings 198 of this embodiment are through-going slits in the wall of the intake tubes 196 and are sized and positioned to inhibit the passage of the bio-tubes 102 yet to allow minimally impeded passage of liquid water.

The ports 176 of the second and third levels 184*b* and 184*c* are positioned such that the intake tubes 196 extend radially outward from the manifold 174. The ports 176 are further positioned such that the intake tubes 196 of each of the second and third levels 184 are positioned approximately 90° apart about the circumference of the manifold 174 and such that the ports 176 of the second and third levels 184 are positioned approximately 45° from being in alignment with each other. Thus, the intake tubes 196 extend radially outward approximately every 45° about the circumference of the manifold 174 in two levels 184.

Figure 6:
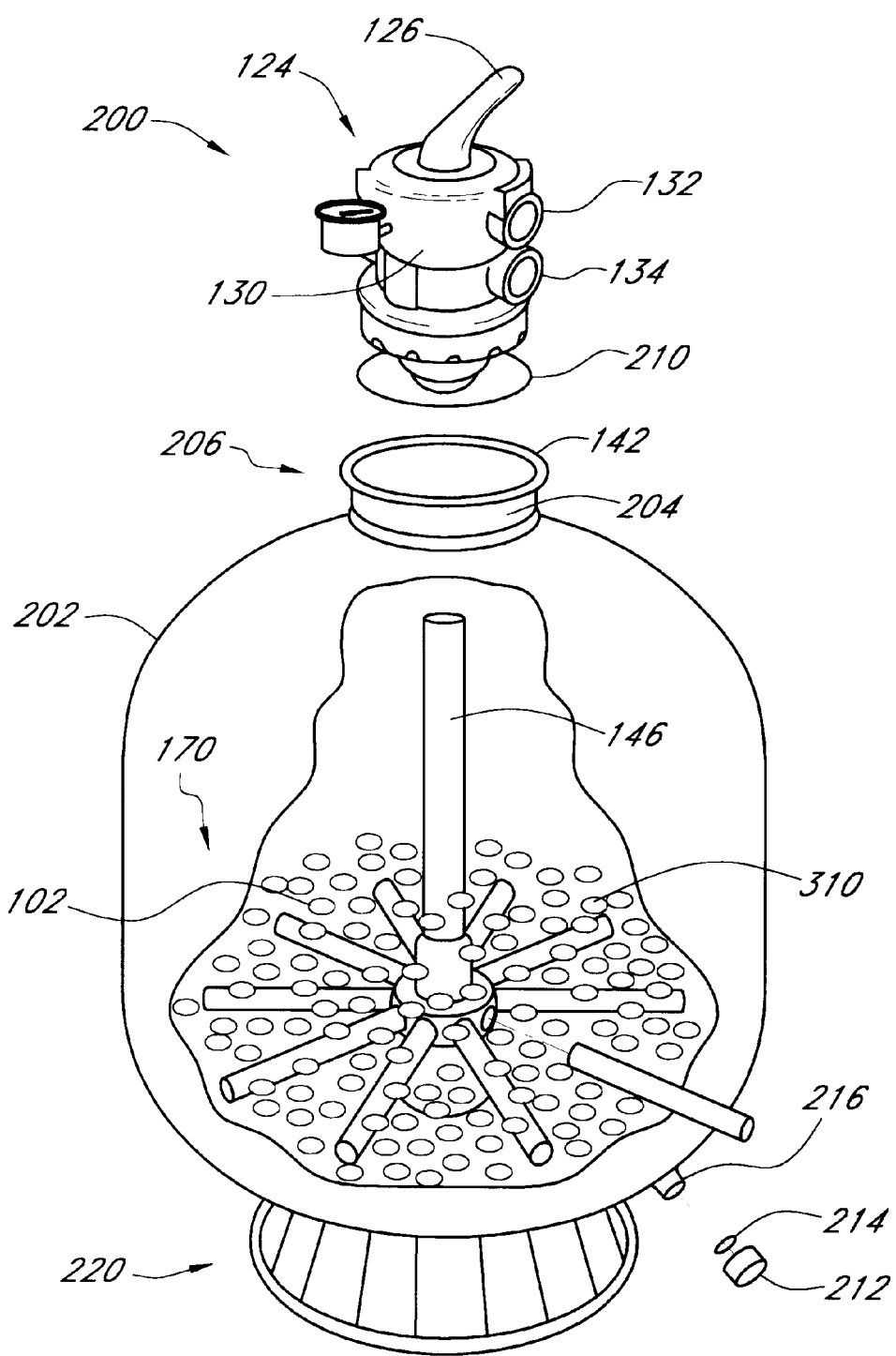
FIG. 6 is an exploded, cutaway, perspective view of the filter mode of the fish pond filter system.

The fish pond filter system 100 comprises a filter mode 200 as shown in FIG. 6. It should understood that FIG. 6 is an exploded, cutaway perspective view of the fish pond filter system 100 with several components of the fish pond filter system 100 not shown for clarity. FIG. 6 shows an alternative embodiment of the intake tube assembly 172 wherein the intake tubes 196 are positioned so as to extend radially outward from the manifold 174 and so as to be positioned approximately every 45° about the circumference of the manifold 174 in a single level 184. It should be appreciated by one skilled in the art that the operation of the intake tube assembly 172 as described as follows is substantially similar to the operation of the embodiment of the intake tube assembly 172 previously described.

The fish pond filter system 100 comprises a container 202. The container 202 is a hollow, closed structure made of a plastic material. The container 202 is sized and adapted to hold approximately 15 to 150 liters of water. The container 202 is preferably sized to adequately filter the volume of the fish pond 300 in a manner well known to those skilled in the art. The container 202 comprises an opening 204 in a top end 206. The opening 204 is a generally circular through-going hole in the top end 206 of the container 202 and is approximately 6" in diameter.

The water flow controller 124 is partially inserted into the container 202 through the opening 204 such that the stand pipe 146, the backwash assembly 170, and the intake tube assembly 172 pass into the interior of the container 202. An O-ring 210 is placed between the top end 206 of the container 202 and the valve body 130. The O-ring 210 is generally a toroid approximately 6" in overall diameter and ¼" in cross-section and is made of a rubber material. The O-ring 210 inhibits water flow out of the container 202. The attachment flange 142 is removably attached to the container 202 so as to secure the water flow controller 124 to the container 202 and also so as to hold the O-ring 210 between the container 202 and the water flow controller 124 in compression. The attachment of the attachment flange 142 in this embodiment comprises a clamping procedure well known in the art. In an alternative embodiment, the attachment of the attachment flange 142 comprises a threading procedure or other known methods of removably attaching two assemblies.

The container 202 also comprises a bottom end 220 opposite the top end 206. The container 202 also comprises a drain hole 216 adjacent the bottom end 220. The drain hole 216 is a through-going hole in the container 202 and is provided with internal, female threads. The container also comprises a drain plug 212 and gasket 214. The drain plug 212 is a brass assembly provided with external, male threads and is sized and threaded so as to be removably threaded into the drain hole 216 so as to hold the gasket 214 between the container 202 and the drain plug 212 in a known manner. The drain plug 212 and gasket 214 inhibit water flow out of the container 202 when they are inserted into the container 202. Removal of the drain plug 212 and gasket 214 allow water contained within the container 202 to freely flow out of the container 202.

A plurality of bio-tubes 102 as previously described are inserted into the container 202 prior to the attachment of the water flow controller 124 previously described so as to fill the container 202 to approximately 50% of capacity. The filtering mode 200 comprises positioning the valve handle 126 to the filter mode 200 position such that water flows freely into the inlet pipe 132 and exits the bottom end 156 of the valve body 130 through the media screen 144. The water fills the container 202 and exits the container 202 by passing into the intake tube assembly 172, through the stand pipe 146, through the valve body 130, and out the outlet pipe 134.

The water entering the fish pond filter system 100 typically is drawn from the fish pond 300 and includes waste 304. The water enters at the top end 206 of the container 202 and exits adjacent the bottom end 220. Thus, the water flow is generally downwards. The bio-tubes 102 have a specific gravity slightly greater than unity and thus will tend to sink and rest adjacent the bottom end 220 of the container 202 in the general manner shown in FIG. 6 thereby defining the filtering media for the system 100. Thus waste 304 contained within the water will pass generally downwards and because of the configuration of the bio-tubes 102 as previously described, the waste 304 will be substantially trapped within and on the upper extent of the bio-tubes 102. The differing shapes and sizes of the bio-tubes 102 are such that the flow of water within the container 202 and through the bio-tubes 102 induces the bio-tubes 102 to stack in a random manner and to not create channels or voids with the bio-tubes 102.

The waste 304 trapped within and on the bio-tubes 102 serves as food material for heterotrophic bacteria 310. The heterotrophic bacteria 310 are naturally occurring in the fish pond 300 and are carried into the fish pond filter system 100 during use. Over time, the heterotrophic bacteria 310 establish colonies on the surface of and within the bio-tubes 102. The heterotrophic bacteria 310 metabolize the waste 304 that becomes trapped on and within the bio-tubes 102 and substantially transform the waste 304 into forms which are more aesthetically pleasing in the fish pond 300 and which are not harmful to the health of the fish 302 in a well known manner. For example, the heterotrophic bacteria 310 metabolize nitrogenous compounds such as ammonia. The structures of the bio-tubes 102 as previously described provide a greater surface area for the culturing of the heterotrophic bacteria 310 than other known filtering systems and can support a greater density of heterotrophic bacteria 310. Thus, the fish pond filter system 100 can process a greater waste 304 load and/or at a faster rate than other comparably sized filtering systems.

The heterotrophic bacteria 310 are not capable of completely metabolizing all of the waste 304 that typically enters a fish pond 300 and this unreacted waste 304 will accumulate over time. Eventually the amount of unreacted waste 304 will accumulate to the point of restricting flow through the fish pond filter system 100. This situation is indicated by the water pressure indicated by the pressure gauge/sight glass 140.

Figure 7:
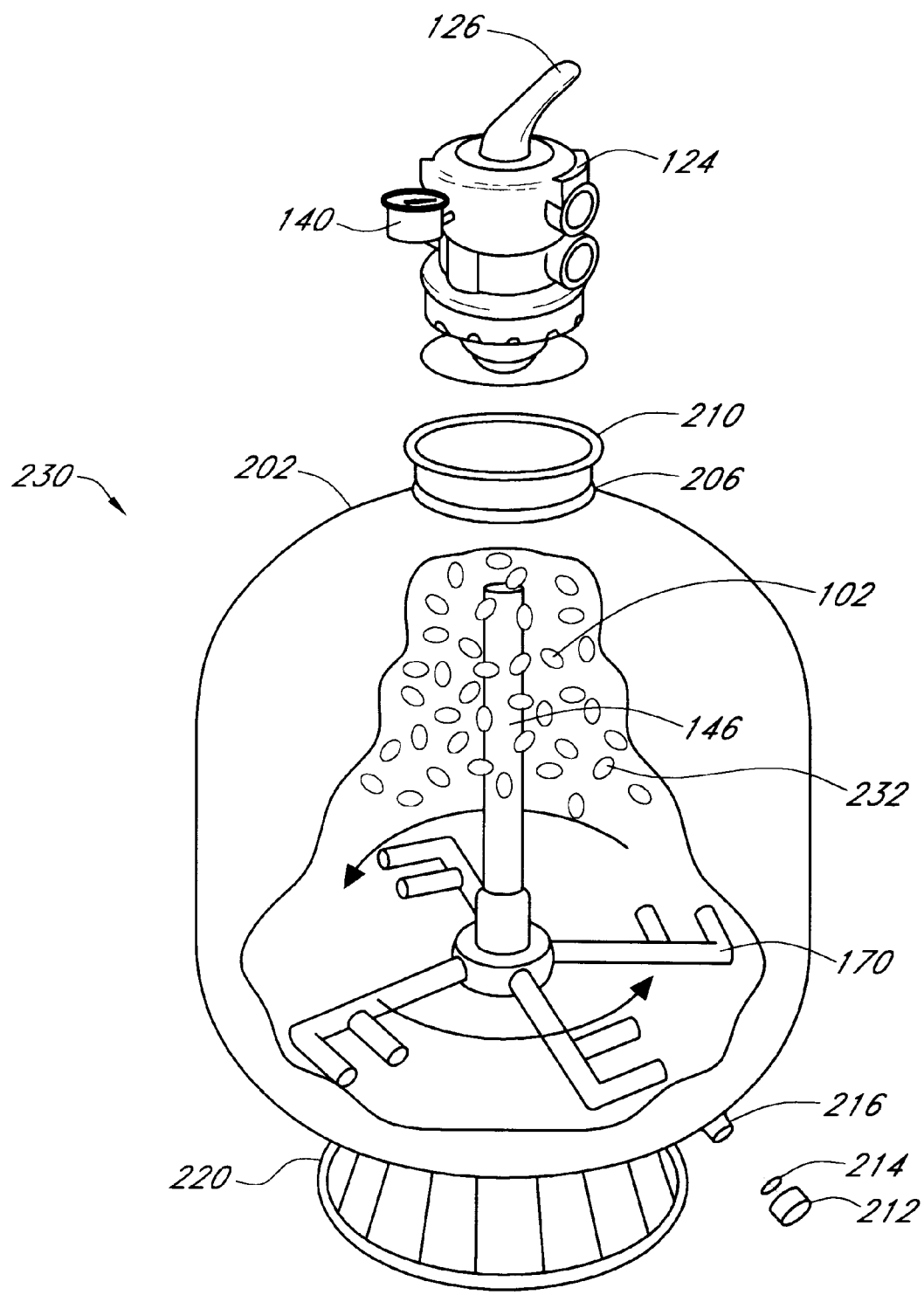
FIG. 7 is an exploded, cutaway, perspective view of the backwash mode of the fish pond filter system.

The fish pond filter system 100 comprises a backwash mode 230 as shown in FIG. 7. The backwash 230 mode is initiated by positioning the valve handle 126 to the backwash 230 mode position. This induces the valve body 130 to direct water flow from the inlet pipe 132, through the valve body 130, through the stand pipe 146, and out through the intake tube assembly 172 and the backwash jet assembly 170 and into the container 202. The water fills the container 202 if it is not already full and then flows past the media screen 144, into the valve body 130, and out the waste pipe 136.

The water flow out of the intake tube assembly 172 dislodges waste 304 material that has accumulated on the intake tubes 196. The water flow out of and the orientation of the backwash jet openings 194 induces a vortical or cyclonic flow 232 pattern within the container 202. This vortical flow 232 causes the bio-tubes 102 to tumble and swirl, efficiently dislodging waste 304 trapped within or on the bio-tubes 102. The vortical flow 232 further advantageously sweeps the dislodged waste 304 upwards and tends to cause the waste and its carrier water to segregate from the bio-tubes 102.

The backwash 230 mode is conducted for a variable period depending on accumulated waste 304 load that, in this embodiment, is approximately 10 minutes. A user can consult the pressure within the valve body 130 and the visible condition of the water flowing therethrough as indicated by the pressure gauge/sight glass 140 as indicia for terminating the backwash 230 mode.

Advantageously, the vortical action results in the bio-tubes 102 and the accumulated waste 304 being entrained in the circling water so as to be urged upwards to the level of the waste pipe 136. The configuration of the backwash ports 176 is such that the water is circulated at a higher velocity in the vortical or cyclonic fashion. The higher velocity of the water results in more of the waste matter 304 being entrained in an upward motion to the level of the waste pipe 136 (FIG. 4) thereby allowing for removal of the waste material 304. Hence, the cyclonic motion of the water as a result of the placement and configuration of the backwash assembly 170 is better able to urge the waste material 304 into the waste pipe 136 for removal from the system 300.

Moreover, the bio-tubes 102 are preferably selected so as to be heavier than the waste material 304 and preferably have a specific gravity selected so that the bio-tubes reside on the bottom 220 of the container 202 in the general manner illustrated in FIG. 6. The waste material 304 generally collects near the upper surface of the layer of bio-tubes 102 comprising the filtration media and is thus located more proximal to the waste pipe 136. Further, since the bio-tubes 102 are generally heavier than the waste material 304, when the system 300 is being backwashed, the waste material 304 is generally entrained in the water above the bio-tubes 102. This allows for flushing of the waste material 304 while reducing the loss of the bio-tubes 102 during the backwashing 230 process.

Following conclusion of the backwash 230 mode, the valve handle 126 is positioned to select a rinse 240 mode. In the rinse 240 mode, water enters the inlet pipe 132, passes through the valve body 130 and enters the container 202 through the media screen 144. The water then exits through the intake tube assembly 172, the stand pipe 146 and out the waste pipe 136. The rinse 240 mode settles the bio-tubes 102 in preparation for return to the filtering mode 200 previously described.

Figure 8:
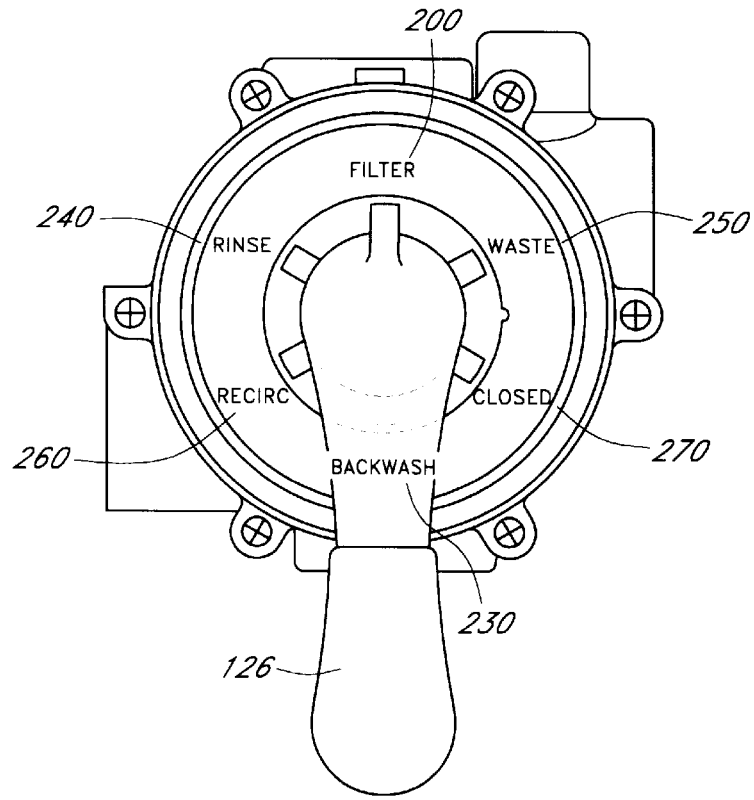
FIG. 8 is a top view of a valve body and valve handle of the present invention showing the positions of the different operational modes of the valve body and filter system.

The fish pond filter system 100 further comprises a waste 250, re-circulate 260, and closed 270 modes selectable by positioning the valve handle 126 as shown in FIG. 8. The waste 250 mode directs water flow into the inlet pipe 132, through the valve body 130 and out the waste pipe 136, bypassing the container 202 and filtering 200 process previously described. The waste 250 mode is used to lower the level of the fish pond 300 without filtering 200 the water. The re-circulate 260 mode directs water into the inlet pipe 132, through the valve body 130, and back out the outlet pipe 134, bypassing the filtering 200 process previously described. The re-circulate 260 mode is used to circulate water in the fish pond 300 without running it through the filtering 200 process previously described. The closed 270 mode blocks water flow into the inlet pipe 132. The closed 270 mode is used to shut off the fish pond filter system 100 from the rest of the fish pond 300.

A side view of a typical installation of the fish pond filter system is shown in FIGS. 9 and 10. The fish pond filter system 100 comprises a pump 320 as shown in FIG. 9. The pump 320 is connected between the fish pond 300 and the inlet pipe 132 and is adapted to pump water from the fish pond 300 to the inlet pipe 132 when supplied with electrical or mechanical power in a well known manner. The pre-filter 306 screens out larger waste 304 particles such as leaves, sticks, or dead fish 302 which are approximately greater than $\frac{1}{8}$" in two dimensions that could damage the pump 320 or plug up the fish pond filter system 100. In the embodiment shown in FIG. 10, the waste pipe 136 extends to discharge unreacted waste 304 and water in the backwash mode 230 as previously described.

The fish pond filter system 100 employs naturally occurring heterotrophic bacteria 310 as part of the filter mode 200. The heterotrophic bacteria 310 metabolizes at least some of the biological waste 304 that is generated and accumulated in the fish pond 300 and thus reduces the chemical treatment that a user of the fish pond filter system 100 needs to employ to maintain the health and appearance of the fish pond 300. Thus a user of the fish pond filter system 100 reduces the inconvenience and health risks associated with handling chemicals.

The bio-tubes 102 of the present invention provide a high surface area-to-volume ratio and thus can support an adequately large population of heterotrophic bacteria 310 in a relatively small container 202. The shape and differing sizes of the bio-tubes 102 of the fish pond filter system 100 are configured to inhibit uniform stacking and channeling during the filter mode 200. Other known filter media have a relatively low surface area-to-volume ratio and thus require larger, more obtrusive systems or are configured such that they tend to uniformly stack during filtering, which leads to the creation of channels within the filter media, which reduces the effectiveness of a filter system so equipped. By minimizing the size of the container 202 needed to adequately filter a given size of fish pond 300, the fish pond filter system 100 minimizes the purchase cost, installation time and cost, and aesthetic impact of the fish pond filter system 100 while still efficiently and reliably filtering the fish pond water.

The fish pond filter system 100 also includes a backwash mode 230, which creates a vortical flow pattern within the filter media container 202. The vortical flow efficiently dislodges accumulated waste 304 trapped within the bio-tubes 102 and entrains the waste 304 out of the fish pond filter system 100. The efficient backwash mode 230, employing the vortical flow, takes less time to clean the filter media and directs less wastewater out of the system 100. Thus, the fish pond filter system 100 furthers saves time and money for a user.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. An apparatus for filtering and cleaning the water of a pond, the system comprising:
   a generally cylindrical container having an inlet through which the container receives water from the pond with waste material entrained therein, the container including an outlet through which filtered water is provided to the pond and a waste outlet through which backwashed water and waste material can be removed from the filtration container;
   filtration media positioned within the filtration container so as to reside adjacent a first surface of the container when water with waste material is being provided to the container from the pond wherein the outlet of the container receives water from a first surface of the filtration media after the water has flowed through the filtration media so as to remove waste material from the water and retain the waste material adjacent a second side of the filtration media to thereby produce the filtered water; and
   a backwash system positioned within the container, wherein the backwash system introduces water tangentially and at least partially at angles of elevation and declination from horizontal into the container so as to form a first vortical flow to urge the filtration media and the waste material contained therein towards a waste pipe located adjacent the second side of the filtration media to thereby permit removal of the waste material from the filtration container wherein the first vortical flow of the filtration media and the waste material facilitates separation of the filtration media from the waste material to further facilitate removal of the waste material.

2. The apparatus of claim 1, wherein the container defines a first and a second end and wherein the inlet and the outlet of the container are positioned adjacent the first end of the container and wherein the filtration media resides adjacent the second end of the container when the container is receiving water with entrained waste material from the pond.

3. The apparatus of claim 2, wherein the outlet that provides the filtered water to the pond receives water from the second end of the container after the water has traveled through the filtration media residing in the second end of the container.

4. The apparatus of claim 2, wherein the container defines a backwash outlet located adjacent the first end of the container.

5. The apparatus of claim 4, further comprising a screen having a plurality of openings sized so as to inhibit the filtration media from passing therethrough, wherein the screen is positioned within the container so as to inhibit the filtration media from being removed from the container while allowing the waste material to pass through the openings into the backwash outlet.

6. The apparatus of claim 1, wherein the filtration media comprises a filtration media that sinks in the water within the container so as to reside adjacent a bottom surface of the container when the pond water is being provided from the pond to be filtered.

7. The apparatus of claim 1, wherein the filtration media comprises a plurality of randomly arranged cylindrical tubes of a plurality of lengths that are selected so as to inhibit stacking of the filtration media during filtration of the pond water.

8. The apparatus of claim 7, wherein the plurality of cylindrical tubes comprise:
   a first number of cylindrical tubes having an outside diameter of approximately 0.30 inches, and a length of approximately 0.39 inches;
   a second number of cylindrical tubes having an outside diameter of approximately 0.18 inches, and a length of approximately 0.234 inches; and
   a third number of cylindrical tubes having an outside diameter of approximately 0.24 inches, and a length of approximately 0.312 inches.

9. The apparatus of claim 1, wherein the filtration media comprises a plurality of cylindrical tubes each having a plurality of ridges formed thereon so that the ridges, the outer surface, and the inner surface of the cylindrical tubes provides a surface that facilitates growth of heterotrophic bacteria.

10. The apparatus of claim 9, wherein the plurality of cylindrical tubes includes interior partitions formed in the inner cavity of the cylindrical tubes wherein the interior partitions define further surfaces to facilitate growth of heterotrophic bacteria.

11. The apparatus of claim 10, wherein the plurality of cylindrical tubes has three interior partitions that define three enclosed passages extending the length of the cylindrical tubes.

12. The apparatus of claim 1, wherein the filtration media comprises bio-tubes made of ABS plastic.

13. Filtration media for filtering a waste material from a pond, the filtration media comprising a plurality of cylindrical tubes that sink when positioned in a filtration container so as to reside adjacent the bottom surface of the filtration container during filtration of waste material from water provided from the pond, wherein the filtration media is of a plurality of different sizes arranged at random so as to inhibit stacking of the filtration media when residing adjacent the bottom surface of the container during filtration of the pond water.

14. The media of claim 13, wherein the plurality of cylindrical tubes comprise:
   a first number of cylindrical tubes having an outside diameter of approximately 0.30 inches, and a length of approximately 0.39 inches;
   a second number of cylindrical tubes having an outside diameter of approximately 0.18 inches, and a length of approximately 0.234 inches; and
   a third number of cylindrical tubes having an outside diameter of approximately 0.24 inches, and a length of approximately 0.312 inches.

15. The media of claim 14, wherein the plurality of cylindrical tubes includes interior partitions formed in the inner cavity of the cylindrical tubes wherein the interior partitions define further surfaces to facilitate growth of heterotrophic bacteria.

16. The media of claim 15, wherein the plurality of cylindrical tubes has three interior partitions that define three enclosed passages extending the length of the cylindrical tubes.

17. The media of claim 16, wherein the filtration media comprises bio-tubes made of ABS plastic.

18. The media of claim 13, wherein the filtration media comprises a plurality of cylindrical tubes each having a plurality of ridges formed thereon so that the ridges, the outer surface and the inner surface of the cylindrical tubes provides a surface that facilitates growth of heterotrophic bacteria.

19. An apparatus for filtering and cleaning the water of a pond, the system comprising:

a container having an inlet through which the container receives water from the pond with waste material entrained therein, the container including an outlet through which filtered water is provided to the pond and a waste outlet through which backwashed water and waste material can removed from the filtration container;

filtration media comprised of a plurality of cylindrical tubes having different sizes that is positioned at random within the filtration container so as to reside adjacent a bottom surface of the container when water with waste material is being provided to the container from the pond wherein the outlet of the container receives water from a bottom side of the filtration media after the water has flowed through the filtration media so as to remove waste material from the water and retain the waste material adjacent a top side of the filtration media to thereby produce the filtered water; and a backwash system positioned in the container, wherein the backwash system introduces water into the container so as to form a first vortical flow to urge the filtration media and the waste material contained therein towards a waste pipe located adjacent the top side of the filtration media to thereby permit removal of the waste material from the filtration container wherein the first vortical flow facilitates separation of the filtration media from the waste material to further facilitate removal of the waste material.

20. The apparatus of claim 19, wherein the outlet that provides the filtered water to the pond receives water from the bottom surface of the container after the water has traveled through the filtration media residing in the bottom surface of the container.

21. The apparatus of claim 19, wherein the container defines a backwash outlet located adjacent a top surface of the container.

22. The apparatus of claim 21, further comprising a screen having a plurality of openings sized so as to inhibit the filtration media from passing therethrough, wherein the screen is positioned within the container so as to inhibit the filtration media from being removed from the container while allowing the waste material to pass through the openings into the backwash outlet.

23. The apparatus of claim 19, wherein the filtration media comprises a plurality of cylindrical tubes each having a plurality of ridges formed thereon so that the ridges, the outer surface and the inner surface of the cylindrical tubes provides a surface that facilitates growth of heterotrophic bacteria.

24. The apparatus of claim 23, wherein the plurality of cylindrical tubes includes interior partitions formed in the inner cavity of the cylindrical tubes wherein the interior partitions define further surfaces to facilitate growth of heterotrophic bacteria.

25. The apparatus of claim 24, wherein the plurality of cylindrical tubes has three interior partitions that define three enclosed passages extending the length of the cylindrical tubes.

26. The apparatus of claim 25, wherein the filtration media comprises bio-tubes made of ABS plastic.

* * * * *